United States Patent Office 3,537,659
Patented Nov. 3, 1970

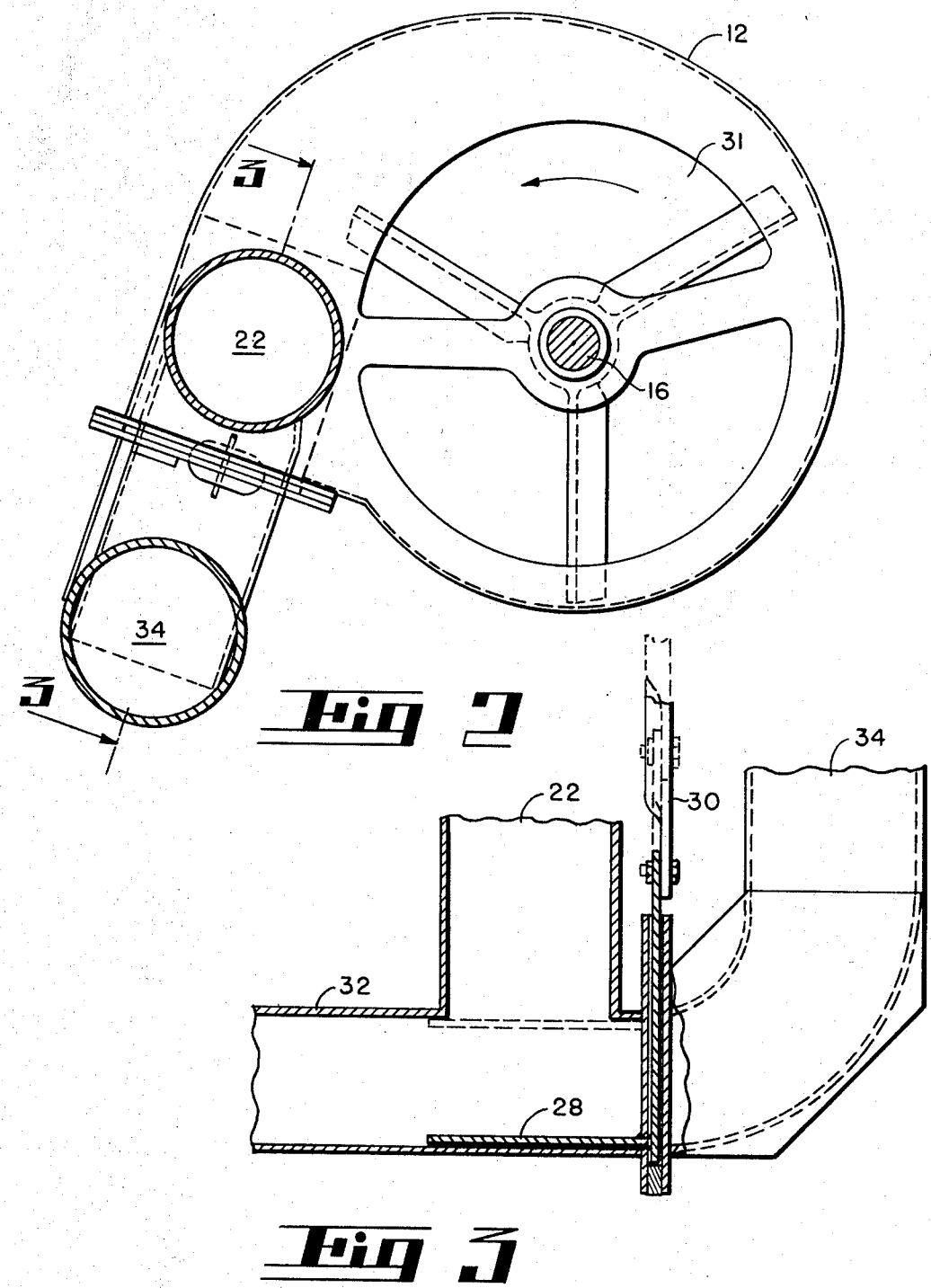

3,537,659
CHOPPER IMPELLER PUMP WITH AGITATION AUGER
Lawrence J. Vagedes, Celina, Ohio, assignor to Avco Corporation, Coldwater, Ohio, a corporation of Delaware
Continuation of application Ser. No. 578,220, Sept. 9, 1966. This application Mar. 17, 1969, Ser. No. 808,011
Int. Cl. B02c 21/02
U.S. Cl. 241—46.02        2 Claims

ABSTRACT OF THE DISCLOSURE

A chopper type pump connected for recirculation is provided with an auger which rotates and is secured to the vertically extending drive shaft of the pump for a distance from the top of the pump adjacent the top of the pit in which the unit is installed. It is possible to set the pump for recirculating and chopping and after this is completed to remove the chopped and mixed material from the pit by connecting the pump to the vertical outlet from the pit.

---

This application is a continuation of application Ser. No. 578,220, filed Sept 9, 1966, now abandoned.

This invention relates to a chopper impeller pump with agitation auger.

In certain systems for handling combined liquid and solid material such as liquid manure and animal wastes in farmstead operations it has been a practice to employ a pit type container in the ground of relatively large size wherein material is conveyed or otherwise dumped into such pit with sufficient liquid to make a relatively thick material. In order to handle such material and convey it away from the location of the barn, the yard, or other place of animal housing, it is necessary to chop and mix the material in such a way that it can be pumped from the pit into certain suitable conveyances such as tank type spreaders. It has been in the best practice to use what is known generally as a chopper type pump which may be a variation of the centrifugal impeller type pump but with some type of chopping mechanism which will assure that material going into the pump will be chopped into sufficiently fine, short lengths that the resulting material, with sufficient liquid combined therewith, can be handled as a liquid provided it is agitated and circulated in the pit by means of the chopper pump and in that way be in a uniform condition suitable for handling by pump means. It has been the practice to provide a chopper type pump located near the bottom of the pit and by power operated shaft from the top to rotate the centrifugal chopper pump and this will start circulation in the pit, drawing material into the pump and ejecting it from a suitable outlet to another part of the pit thus creating circulation which will gradually bring all material through the pump and mix and chop the material to a relatively uniform consistency.

It is a primary object of this invention to improve the feeding of material to a chopper type pump and to assist the circulation of material toward the pump to thereby speed up circulation and mixing in a container for solid and liquid material.

More specifically, it is an object to provide a rotating auger extending above a pump and thus feed the material downward to the inlet of the chopper pump. Thus the portion of the material above the pump which is agitated by the auger and driven downward toward the pump inlet will cause material to flow toward the region of the auger over a substantial portion of depth of the pit. This also acts to break up chunks of material by contact which is in addition to the chopping action of the pump. Such action produces a more efficient circulation than would otherwise result with unassisted feed of the material into the pump only in the region adjacent the pump.

Above and other objects of the invention will appear more fully from the following more detailed description and by reference to the accompanying drawings forming a part hereof and wherein:

FIG. 2 is a top view showing the pump and adjacent valves taken substantially on the line 2—2 of FIG. 1.

FIG. 3 is a section through the valve between the pump and the outlets taken substantially on line 3—3 of FIG. 2.

Figure 1:
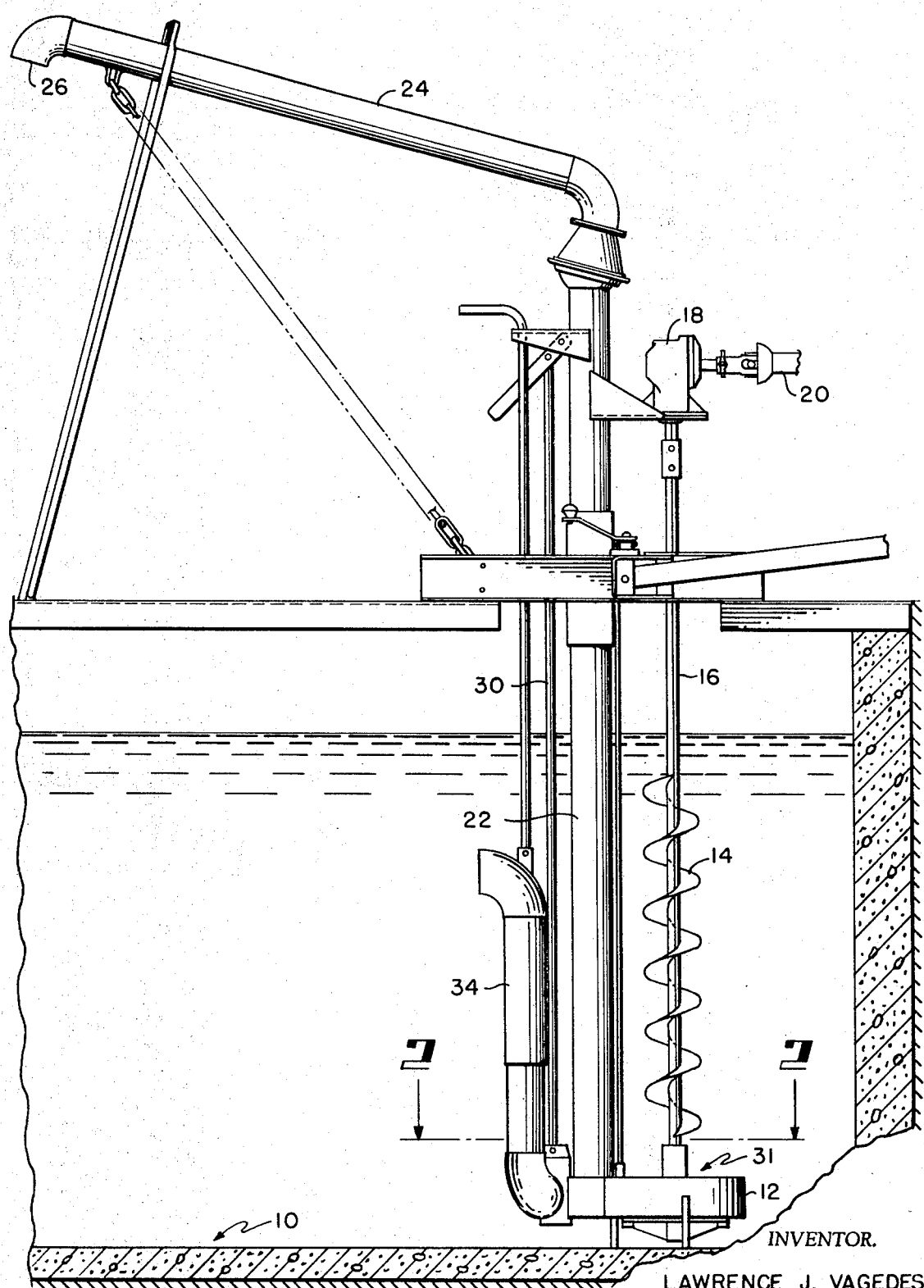
FIG. 1 is a cross-section through a portion of a pit containing material to be agitated and chopped by the pump showing the auger as well as a means to remove material from the pump by means of different setting of the valves to and from the pump.

Referring to the drawings, particularly to FIG. 1, there is shown in cross-section a pit 10 containing material to be agitated and pumped. Adjacent the bottom of this pit there is shown a centrifugal chopper type pump 12. On the axis of rotation which extends upward from the pump 12, a rotating auger 14 is secured to rotate with the shaft 16 which is driven from the top of the pit through a suitable gear box 18 and drive shaft 20 which is rotated by suitable power mechanism. Refering to FIG. 2 of the drawings, the centrifugal pump 12 is shown extending from its outlet into a vertical pipe 22 which, as shown in FIG. 1, extends vertically above the pit into a generally horizontal pipe 24 which has an outlet 26 which will be provided of such length as to move material pumped from the pit 10 into a tank type spreader or other conveying means.

As shown in FIG. 3 as well as in FIG. 1, there is provided a valve plate 28 which on vertical movement of the rod 30 will move from the position shown in full lines in FIG. 3 to the dotted position in FIG. 3 so that when the valve is shown in full line position in FIG. 3 the valve is connected so that material coming through the pipe 32 from the pump 12 will be forced into the outlet pipe 22 while with the valve as shown in the dotted position of FIG. 3 the material pumped will go out the recirculating nozzle 34.

In operation a principal feature of this invention is to provide for recirculation of material in the pit 10 by the provision of a positive downward feed means such as an auger 14 on the axis of the pump 12 extending upwardly from the pump so that it will force material in the pit downward into the center inlet 31 of the chopper pump 12 and out through the outlet pipe 32, and into the recirculating nozzle 34 so that continuous rotation of the pump shaft 16 from the power shaft 20 will cause recirculation of the material in the pit, which circulation will be very positively accelerated by the use of the vertical auger in the material above the pump and feeding the inlet 31 of the pump. This auger as shown extends from a position relatively near the top of the pit directly downward into the chopper pump inlet.

The inlet to the chopper is shown on the top side of the impeller housing. However, some installations use a pump with inlet on the bottom side. This arrangement would also operate satisfactorily as has been demonstrated in actual tests with the illustrative structure.

Although the invention has been described by reference to a specific structure found practical in actual operation, it is intended that various modifications may be made within the scope of the following claims.

I claim:
1. In combination with a chopper type pump for use in a pit for chopping liquid and solid material into a relatively uniform condition wherein the pump is located in the lower portion of the pit with its rotating axis, drive shaft, and inlet extending in a generally upward direction from the pump:

an auger upwardly extending from the pump to adjacent the top of the pit and rotating on the axis of said drive shaft and secured to said shaft to be driven thereby in position to move material above said pump downwardly into the inlet of said pump thereby to provide circulation in the pit and to assist the completion of the mixing and the chopping of material in the pit.

2. In a system for agitating and discharging material from a mixture of liquid and solid material stored in a pit, said system being of the type comprising a chopper type pump disposed in the lower portion of the pit and having an upwardly extending drive shaft and inlet, and generally upwardly and outwardly extending discharge piping, the combination:

auger means secured to said shaft and extending vertically upwardly from the pump to adjacent the top of the pit and formed to move material above the pump downwardly to the inlet of said pump, thereby to provide circulation in the pit and to assist in the mixing and chopping of material to be discharged by the pump, a bypass pipe having an inlet and an outlet adapted to be submerged in said material, and valve means for selectively coupling the outlet of the pump either to the discharge piping or to the bypass piping whereby when the bypass piping is selected circulation of agitated material is maintained within the pit.

References Cited

UNITED STATES PATENTS

| | | | |
|---|---|---|---|
| 2,480,998 | 9/1949 | Brackett | 241—97 X |
| 2,796,006 | 6/1957 | Chaplin | 241—97 X |
| 2,714,354 | 8/1955 | Farrand | 241—101 X |
| 2,975,714 | 3/1961 | Nechine. | |
| 3,319,896 | 5/1967 | Anderson | 241—101 X |
| 3,417,929 | 12/1968 | Secrest | 241—246 X |

FOREIGN PATENTS 68,610 2/1949 Denmark.

JAMES M. MEISTER, Primary Examiner

U.S. Cl. X.R.

241—97, 101, 246